US008543160B2

(12) United States Patent
Hung

(10) Patent No.: US 8,543,160 B2
(45) Date of Patent: Sep. 24, 2013

(54) SYSTEM FOR ANTENNA EXTENSION AND METHOD THEREOF

(75) Inventor: Yu-Kai Hung, New Taipei (TW)

(73) Assignee: Acer Incorporated, New Taipei (TW)

( * ) Notice: Subject to any disclaimer, the term of this patent is extended or adjusted under 35 U.S.C. 154(b) by 1 day.

(21) Appl. No.: 13/421,848

(22) Filed: Mar. 15, 2012

(65) Prior Publication Data

US 2013/0072132 A1 Mar. 21, 2013

(30) Foreign Application Priority Data

Sep. 15, 2011 (TW) ............................ 100133235 A

(51) Int. Cl.
*H04M 1/00* (2006.01)

(52) U.S. Cl.
USPC .................................... 455/556.1; 455/575.7

(58) Field of Classification Search
USPC .................. 455/129, 575.7, 269, 556.1, 557; 343/702
See application file for complete search history.

(56) References Cited

U.S. PATENT DOCUMENTS

| | | | | |
|---|---|---|---|---|
| 7,196,668 | B2 * | 3/2007 | Lin et al. | 343/702 |
| 7,725,114 | B2 * | 5/2010 | Feher | 455/456.1 |
| 8,125,942 | B2 * | 2/2012 | Horikoshi et al. | 370/328 |
| 2007/0071149 | A1 * | 3/2007 | Li et al. | 375/347 |

FOREIGN PATENT DOCUMENTS

TW M309709 4/2007

OTHER PUBLICATIONS

"Notice of Allowance of Taiwan counterpart application" issued on Aug. 12, 2013, p1-p4, in which the listed reference was cited.

* cited by examiner

*Primary Examiner* — Sonny Trinh
(74) *Attorney, Agent, or Firm* — Jianq Chyun IP Office

(57) ABSTRACT

A system for antenna extension and a method adapted for antenna extension operation under a specific communication protocol are provided. The antenna extension system combines a handheld communication device with a base device, and determines if the total antenna number of the handheld communication device and the base device matches the standard antenna number of the specific communication protocol. If the total antenna number of the handheld communication device and the base device matches the standard antenna number of the specific communication protocol, the antenna extension system enables the antenna extension operation.

11 Claims, 7 Drawing Sheets

SYSTEM FOR ANTENNA EXTENSION AND METHOD THEREOF

CROSS-REFERENCE TO RELATED APPLICATION

This application claims the priority benefit of Taiwan application serial no. 100133235, filed on Sep. 15, 2011. The entirety of the above-mentioned patent application is hereby incorporated by reference herein and made a part of this specification.

BACKGROUND OF THE INVENTION

1. Field of the Invention

The invention relates to a system for antenna extension and a method thereof, and in particular relates to a system, which carries out antenna extension by combining a handheld device with a base device, and a method thereof.

2. Description of Related Art

Wireless communication system is developing and advancing rapidly. In the process of development, the technology of Multiple Input Multiple Output (MIMO) is gradually applied to the new communication system. According to the $3^{rd}$ Generation Partnership Project (3GPP) standard, MIMO has been included as a system requirement in Evolved High Speed Packet Access (HSPA+) and Long Term Evolution (LTE) standards. According to Long Term Evolution-Advanced (LTE-Advanced) standard which is about to be established completely, not only the receiving terminal needs to incorporate MIMO technology, the transmission of the user equipment (UE) also needs to provide multiple-output function. In addition, the LTE-Advanced standard may very likely evolve to support 4T8R. As a result, the antenna space configuration for user equipment and the fabrication thereof will become more difficult.

The currently-adopted solution for MIMO is to configure all the antennae in the handheld device, but there are some limitations and disadvantages. First, due to the limited space, the radiation efficiency of the antennae would be worse. In addition, antennae configured into limited space may influence each other and quite often cannot meet the system requirements, resulting in low system transmission efficiency. According to LTE standard which is the mainstream, a mobile phone system can support multiple antennae of 1T2R (one transmitting antenna and two receiving antennae) or 1T4R (one transmitting antenna and four receiving antennae) at maximum. However, the design of two receiving antennae is difficult to realize in a handheld device due to the limited space. And, it will be even more challenging to configure four receiving antennae. Therefore, how to dispose multiple antennae into the limited space of the current handheld devices has become an important issue.

SUMMARY OF THE INVENTION

Considering the above, the invention provides an antenna extension system and a method thereof, which combine a handheld device with a base device, to solve the problem of limited space.

The invention provides an antenna extension system, adapted for an antenna extension operation under a communication protocol. The communication protocol requires P sets of transmitting antennae and Q sets of receiving antennae, wherein P and Q are positive integers respectively. The antenna extension system includes a handheld communication device and a base device. The handheld communication device comprises M sets of transmitting antennae, N sets of receiving antennae, and a first extension connector, wherein M and N are positive integers respectively. The base device comprises J sets of transmitting antennae, K sets of receiving antennae, and a second extension connector, wherein J and K are positive integers respectively. When the handheld communication device detects the connection between the first extension connector and the second extension connector, the handheld communication device determines whether J is equal to P-M and whether K is equal to Q-N. When the handheld communication device determines that J is equal to P-M and K is equal to Q-N, the handheld communication device activates the M sets of transmitting antennae and the N sets of receiving antennae and sends an enabling command to the base device to enable the J sets of transmitting antennae and the K sets of receiving antennae of the base device.

In one embodiment of the invention, the handheld communication device includes a first detection module and a first control module, wherein the first control module is coupled to the first detection module. The first detection module is coupled to the first extension connector and detects if the first extension connector is connected with the second extension connector. When the first extension connector and the second extension connector are connected, the first control module determines whether J is equal to P-M and whether K is equal to Q-N. When the first control module determines that J is equal to P-M and K is equal to Q-N, the first control module enables the M sets of transmitting antennae and the N sets of receiving antennae and sends an enabling command to the base device to enable the J sets of transmitting antennae and the K sets of receiving antennae of the base device.

In one embodiment of the invention, the handheld communication device further includes a first display module. The first display module is coupled to the first control module. When the first control module determines that J is equal to P-M and K is equal to Q-N, the first control module controls the first display module to display a first enabling message.

In one embodiment of the invention, when the first control module determines that J is unequal to P-M or K is unequal to Q-N, the first control module controls the first display module to display a first disabling message, and the first control module sends a disabling command to the base device.

In one embodiment of the invention, the base device further comprises a second display module, a second detection module, and a second control module. The second detection module is coupled to the second extension connector and detects if the enabling command or the disabling command is received. The second control module is coupled to the second display module and the second detection module. When the second detection module receives the enabling command, the second control module activates the J sets of transmitting antennae and the K sets of receiving antennae and controls the second display module to display a second enabling message. When the second detection module receives the disabling command, the second control module controls the second display module to display a second disabling message.

In one embodiment of the invention, the aforesaid communication protocol comprises 3GPP LTE standard, 3GPP LTE-Advanced standard, Evolved High Speed Packet Access (HSPA+) standard, and Wide Fidelity (WiFi) standard.

The invention further provides an antenna extension method, adapted for enabling an antenna extension operation in a communication protocol by combining a handheld communication device with a base device, wherein the communication protocol requires P sets of transmitting antennae and Q sets of receiving antennae; wherein the handheld communication device includes M sets of transmitting antennae, N sets of receiving antennae, and a first extension connector; wherein the base device includes J sets of transmitting antennae, K sets of receiving antennae, and a second extension connector, and wherein P, Q, M, N, J, and K are positive integers respectively. The antenna extension method includes: detecting whether the first extension connector and the second extension connector are connected and determining whether J is equal to P-M and whether K is equal to Q-N. When the handheld communication device determines that J is equal to P-M and K is equal to Q-N, the handheld communication device activates the M sets of transmitting antennae and the N sets of receiving antennae and sends an enabling command to the base device to enable the J sets of transmitting antennae and the K sets of receiving antennae.

Based on the above, the invention is directed to the problem that a communication system may not provide sufficient space for antenna and optimized system transmission efficiency. The problem of insufficient space can be solved by combining the handheld communication device with the base device.

In order to make the aforementioned and other features and advantages of the invention more comprehensible, embodiments accompanying figures are described in detail below.

BRIEF DESCRIPTION OF THE DRAWINGS

The accompanying drawings constituting a part of this specification are incorporated herein to provide a further understanding of the invention. Here, the drawings illustrate embodiments of the invention and, together with the description, serve to explain the principles of the invention.

DESCRIPTION OF EMBODIMENTS

Figure 1A:
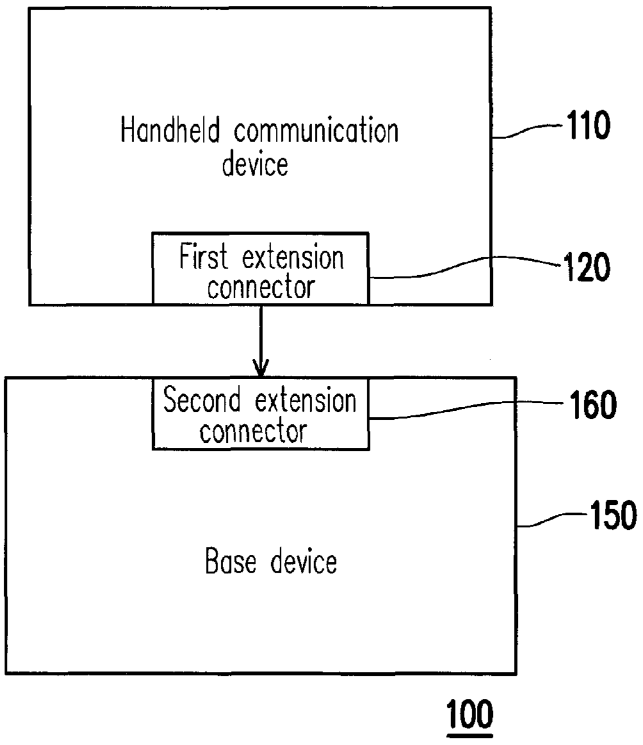
FIG. 1A is a block diagram showing an antenna extension system according to an embodiment of the invention.

FIG. 1A is a block diagram showing an antenna extension system according to an embodiment of the invention. An antenna extension system 100 is adapted for an antenna extension operation under a communication protocol. The communication protocol can be 3GPP LTE standard, 3GPP LTE-Advanced standard, Evolved High Speed Packet Access (HSPA+) standard, Wide Fidelity (WiFi), etc., but is not limited to the foregoing. In one embodiment of the invention, the communication protocol requires P sets of transmitting antennae and Q sets of receiving antennae, wherein P and Q are positive integers respectively.

The antenna extension system 100 includes a handheld communication device 110 and a base device 150. The handheld communication device 110 can be a mobile phone, a smart phone, etc. According to one exemplary embodiment of the invention, the handheld communication device 110 comprises M sets of transmitting antennae, N sets of receiving antennae, and a first extension connector 120, wherein M and N are positive integers respectively. In one of the exemplary embodiments, the base device 150 is an electronic device that only includes multiple transmitting/receiving antennae but without a central processor. In other embodiments, however, the base device 150 can be a tablet computer, a laptop, etc., which also includes a central processor, an input device, and a display. In one exemplary embodiment of the invention, the base device 150 comprises J sets of transmitting antennae, K sets of receiving antennae and a second extension connector 160, wherein J and K are positive integers respectively. The first extension connector 120 and the second extension connector 160 include terminal pins that correspond to each other.

Figure 2A:
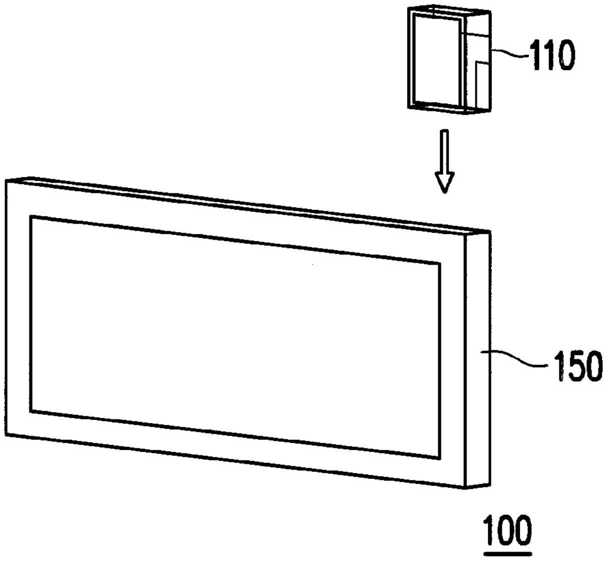
FIG. 2A illustrates an antenna extension system according to an embodiment of the invention.
Figure 2B:
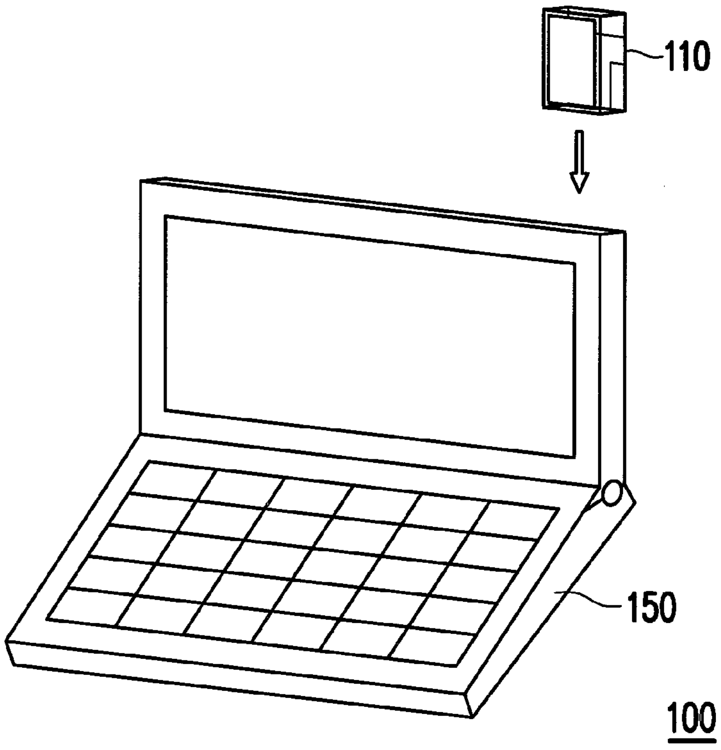
FIG. 2B illustrates an antenna extension system according to another embodiment of the invention.
Figure 2C:
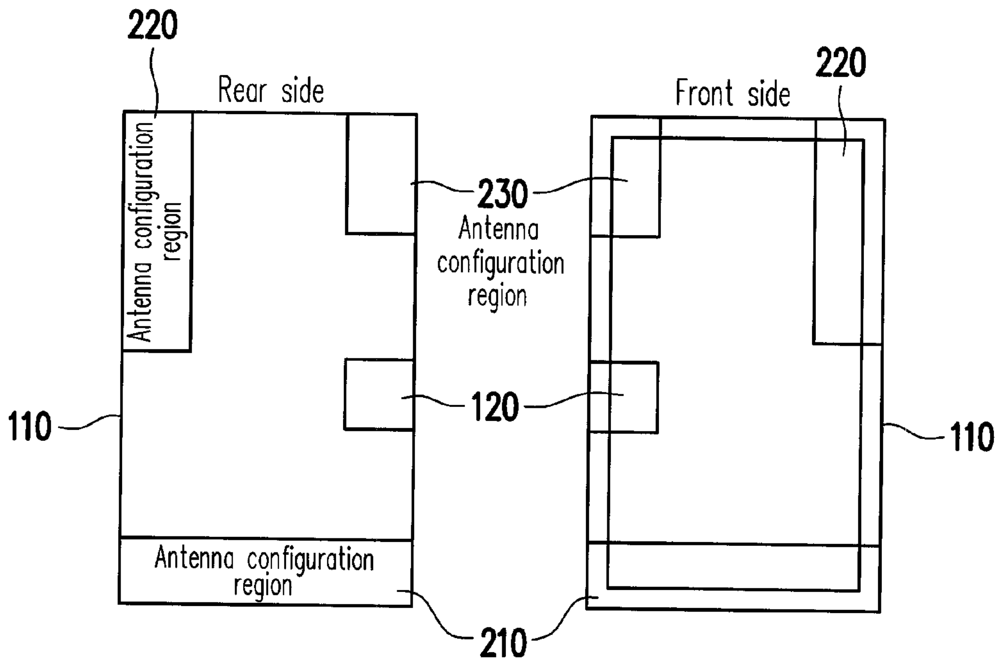
FIG. 2C is a diagram illustrating a handheld communication device of an antenna extension system according to an embodiment of the invention.

The antenna extension system 100 of the invention combines the transmitting/receiving antennae of the handheld communication device 110 with the transmitting/receiving antennae of the base device 150 to meet the number required by the communication protocol, thereby solving the problem that the handheld communication device 110 may not have sufficient space for disposing antennae therein. FIGS. 2A~2B illustrate an antenna extension system according to an exemplary embodiment of the invention. FIG. 2C depicts an antenna extension system in a handheld communication device according to another exemplary embodiment of the invention. According to the embodiment of FIG. 2A, the handheld communication device 110 is a mobile phone, and the base device 150 is a tablet computer. In the embodiment of FIG. 2B, the handheld communication device 110 is a mobile phone, and the base device 150 is a laptop. FIG. 2C provides a front schematic view and a rear schematic view of the handheld communication device 110, wherein MIMO transmitting/receiving antennae are disposed in an antenna configuration region 210 and an antenna configuration region 220, which is for example an antenna module in accordance with 3GPP LTE standard. In an antenna configuration region 230, transmitting/receiving antennae of other communication protocols are disposed, such as an antenna module in accordance with Wide Fidelity (WiFi) or an antenna module for Global Positioning System (GPS). It should be noted that FIG. 2C is only one of the embodiments of the invention. The arrangement of the antenna configuration regions of the invention is not limited to the disclosure of FIG. 2C.

Figure 2D:
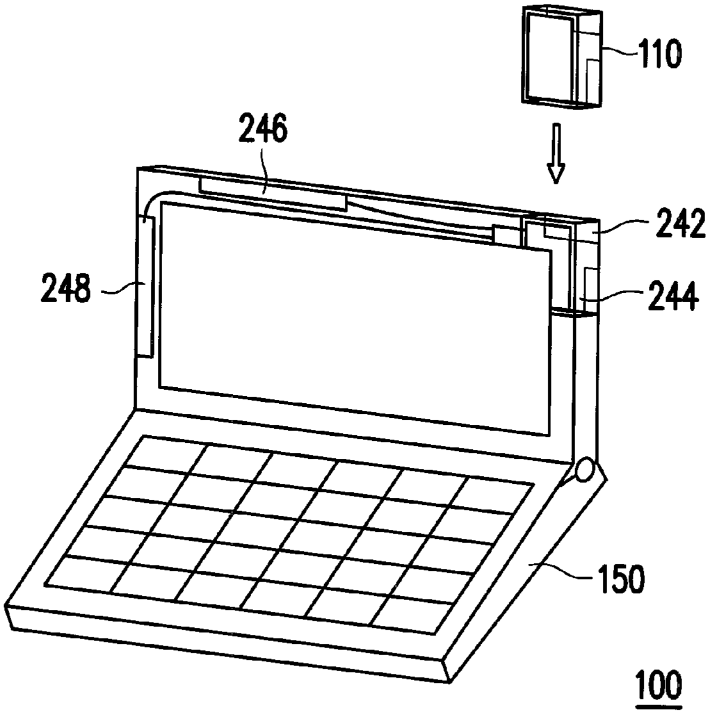
FIG. 2D illustrates an antenna extension system according to an embodiment of the invention.

In the embodiment of FIG. 2D, the communication protocol prescribes a communication mode of a user equipment (UE) to be 1T4R (one transmitting antenna and four receiving antennae). In this exemplary embodiment, the handheld communication device 110 includes a transmitting/receiving antenna set 242 and a receiving antenna set 244, and the base device 150 includes a receiving antenna set 246 and a receiving antenna set 248. That is, through combining the transmitting/receiving antenna sets of the handheld communication device 110 and the base device 150, the antenna extension system 100 as a whole can conform to the communication mode of 1T4R, as prescribed by the communication protocol.

Figure 2E:
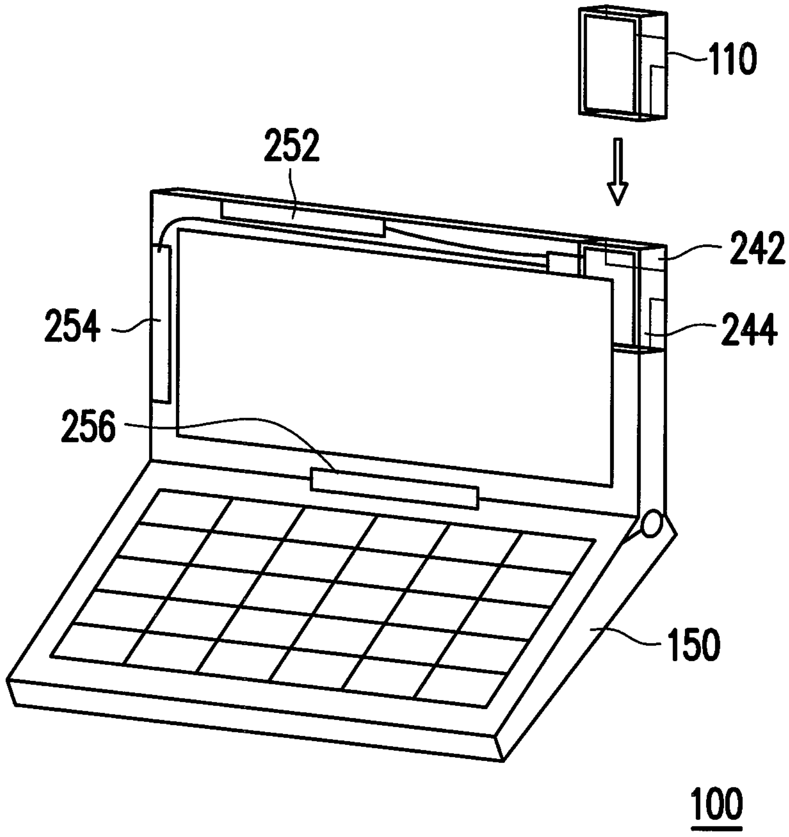
FIG. 2E is a diagram depicting an antenna extension system according to an embodiment of the invention.

In the embodiment of FIG. 2E, the communication protocol prescribes the communication mode of the UE to be 4T4R (four transmitting antennae and four receiving antennae). In this exemplary embodiment, the handheld communication device 110 includes the transmitting/receiving antenna set 242 and the receiving antenna set 244, and the base device

150 includes a transmitting/receiving antenna set 252, a transmitting/receiving antenna set 254, and a transmitting antenna set 256. In other words, through combining the transmitting/receiving antenna sets of the handheld communication device 110 and the base device 150, the antenna extension system 100 as a whole can conform to the communication mode of 4T4R, as prescribed by the communication protocol.

Figure 1B:
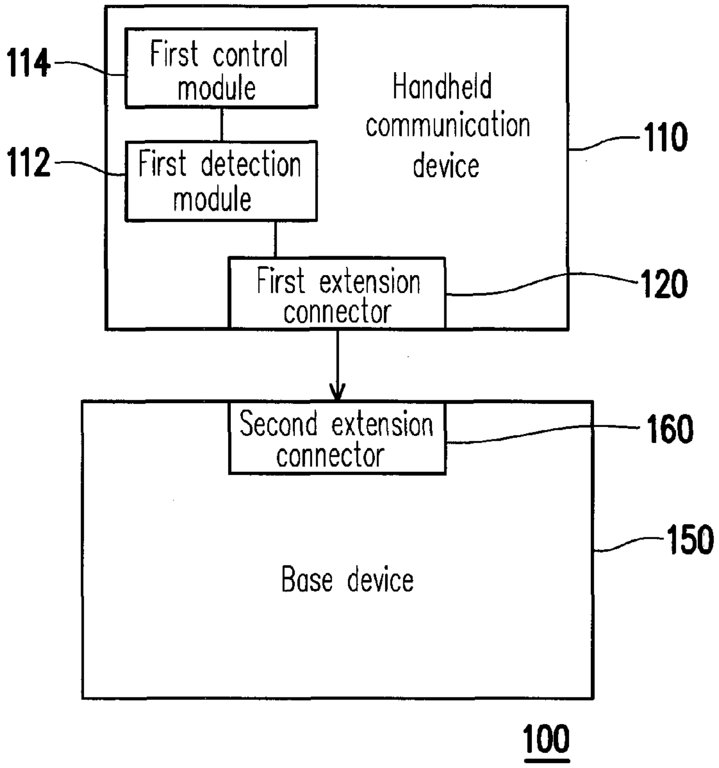
FIG. 1B is a block diagram showing an antenna extension system according to another embodiment of the invention.

FIG. 1B is a block diagram showing an antenna extension system according to another embodiment of the invention. The handheld communication device 110 comprises the first extension connector 120, a first detection module 112, and a first control module 114. Specifically, the first detection module 112 is coupled to the first extension connector 120, and the first detection module 112 is a circuit element that detects whether the first extension connector 120 and the second extension connector 160 are connected. The first control module 114 is coupled to the first detection module 112. The first control module 114 is a hardware circuit, software, or firmware that can execute the functions of a processor, but is not limited to the foregoing.

Figure 3A:
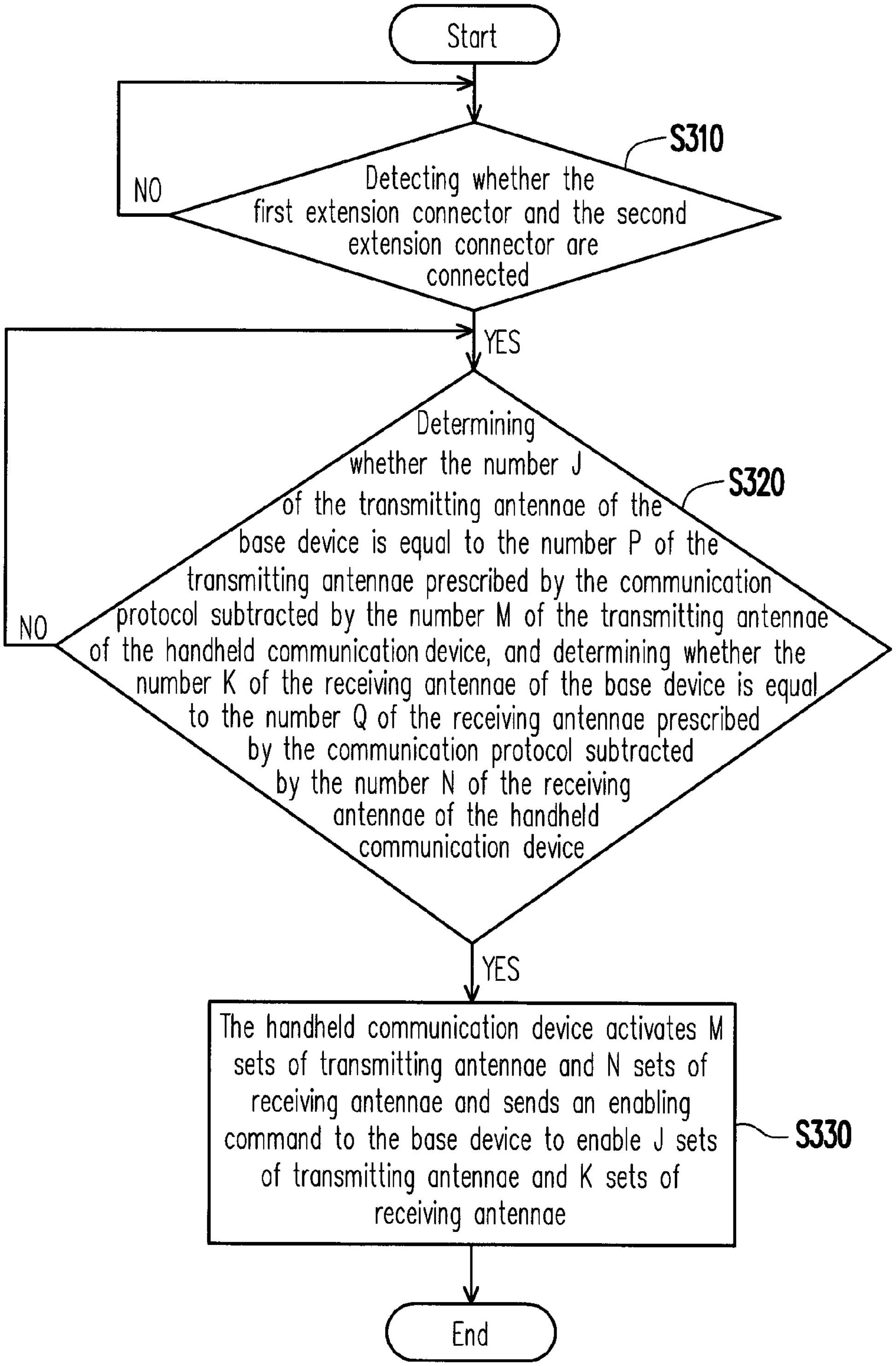
FIG. 3A is a flowchart showing an antenna extension method according to an embodiment of the invention.

FIG. 3A is a flowchart showing an antenna extension method according to an embodiment of the invention. First, the first detection module 112 detects whether the first extension connector 120 and the second extension connector 160 are connected (Step S310). If it is determined in Step S310 that the first extension connector 120 is connected with the second extension connector 160, the first control module 114 further determines whether the number J of the transmitting antennae of the base device 150 is equal to the number P of the transmitting antennae prescribed by the communication protocol subtracted by the number M of the transmitting antennae of the handheld communication device 110, and determines whether the number K of the receiving antennae of the base device 150 is equal to the number Q of the receiving antennae prescribed by the communication protocol subtracted by the number N of the receiving antennae of the handheld communication device 110 (Step S320). In other words, the first control module 114 determines whether J is equal to P-M and whether K is equal to Q-N. If the determination of Step S320 is YES, the first control module 114 of the handheld communication device 110 activates the M sets of transmitting antennae and the N sets of receiving antennae, and sends an enabling command to the base device 150 to enable the J sets of transmitting antennae and the K sets of receiving antennae (Step S330).

Figure 1C:
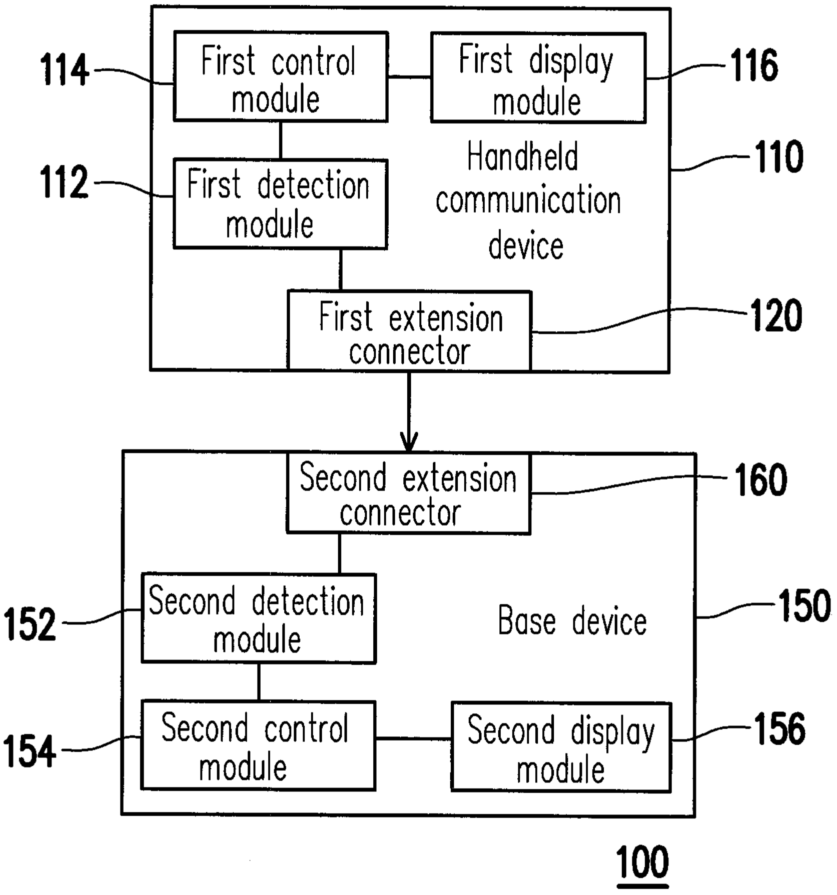
FIG. 1C is a block diagram showing an antenna extension system according to another embodiment of the invention.

FIG. 1C is a block diagram showing an antenna extension system according to another embodiment of the invention. In the exemplary embodiment of FIG. 1C, the handheld communication device 110 further comprises a first display module 116 in addition to the first extension connector 120, the first detection module 112, and the first control module 114, wherein the first display module 116 can be a display screen of a mobile phone or smart phone. In this embodiment, the base device 150 comprises: the second extension connector 160, a second detection module 152, a second control module 154, and a second display module 156. The second detection module 152 is coupled to the second extension connector 160, and the second detection module 152 is a circuit element that can detect the receipt of an enabling command or a disabling command. The second control module 154 is coupled to the second display module 156 and the second detection module 152. The second control module 154 is a hardware circuit, software, or firmware that can execute the functions of a processor, but not limited thereto. The second display module 156 can be a display screen of a laptop or tablet computer.

Figure 3B:
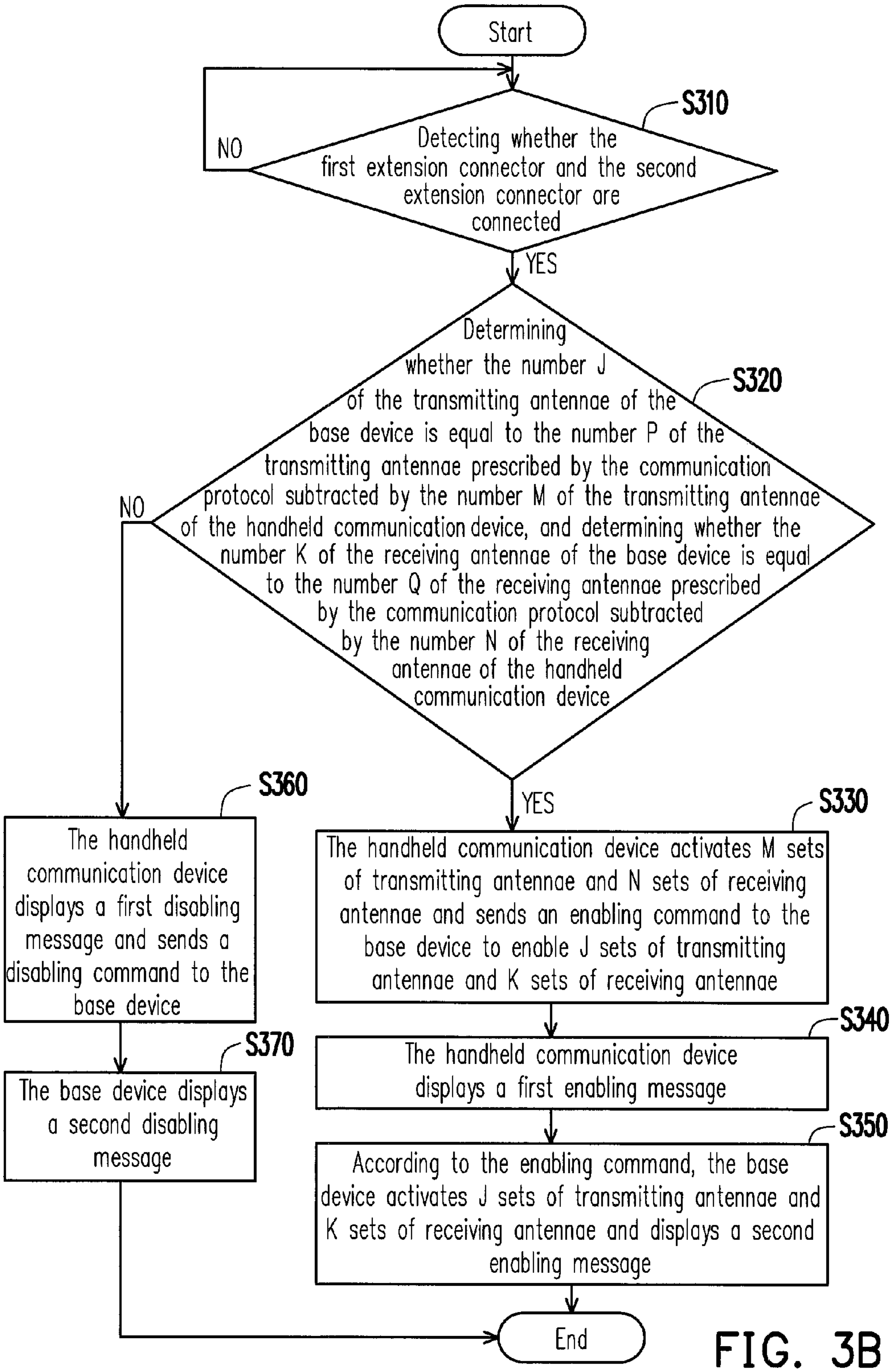
FIG. 3B is a flowchart showing an antenna extension method according to another embodiment of the invention.

Please refer to FIG. 1C and FIG. 3B. FIG. 3B is a flowchart showing an antenna extension method according to the embodiment of FIG. 1C. In the embodiment of FIG. 3B, if the determination of Step S320 is YES, the first control module 114 of the handheld communication device 110 activates the M sets of transmitting antennae and the N sets of receiving antennae and sends an enabling command to the base device 150 to enable the J sets of transmitting antennae and the K sets of receiving antennae (Step S330). Furthermore, the first control module 114 controls the first display module 116 to display a first enabling message (Step S340), e.g. "executing antenna extension operation," to remind the user. When the second detection module 152 receives the enabling command sent from the handheld communication device 110, the second control module 154 activates the J sets of transmitting antennae and the K sets of receiving antennae of the base device 150, and controls the second display module 156 to display a second enabling message, e.g. "executing antenna extension operation," to remind the user (Step S350).

If the determination of Step S320 is NO, the first control module 114 sends a disabling command to the base device 150 and controls the first display module 116 to display a first disabling message (Step S360), e.g. "this base device does not conform to antenna extension operation," to remind the user. Then, when the second detection module 152 receives the disabling command sent from the handheld communication device 110, the second control module 154 controls the second display module 156 to display a second disabling message (Step S370), e.g. "this base device does not conform to antenna extension operation," to remind the user.

In sum of the above, the antenna extension system and method of the invention are directed to the problem of insufficient space for antenna in communication system and optimized system transmission efficiency. A handheld communication device of small size may not accommodate many transmitting and receiving antennae. The antenna extension method of the invention utilizes a combination of the handheld communication device and the base device to greatly increase the extensibility of the handheld communication device, so as to overcome the problem that the handheld communication device may not have sufficient space for disposing antennae.

Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. An antenna extension system adapted for an antenna extension operation in a communication protocol, wherein the communication protocol requires P sets of transmitting antennae and Q sets of receiving antennae, and P and Q are positive integers respectively, the antenna extension system comprising:

a handheld communication device, comprising M sets of transmitting antennae, N sets of receiving antennae, and a first extension connector, wherein M and N are positive integers respectively;

a base device, comprising J sets of transmitting antennae, K sets of receiving antennae, and a second extension connector, wherein J and K are positive integers respectively; and the handheld communication device determines if J is equal to P-M and if K is equal to Q-N when the handheld communication device detects that the first extension connector and the second extension connector are connected; when the handheld communication device determines that J is equal to P-M and K is equal to Q-N, the handheld communication device activates the M sets of transmitting antennae and the N sets of receiving antennae and sends an enabling command to the base device to enable the J sets of transmitting antennae and the K sets of receiving antennae.

2. The antenna extension system according to claim 1, wherein the handheld communication device comprises:

a first detection module, coupled to the first extension connector and detecting if the first extension connector and the second extension connector are connected; and a first control module, coupled to the first detection module and determining if J is equal to P-M and if K is equal to Q-N when the first extension connector and the second extension connector are connected; wherein the first control module enables the M sets of transmitting antennae and the N sets of receiving antennae and sends the enabling command to the base device to enable the J sets of transmitting antennae and the K sets of receiving antennae when the first control module determines that J is equal to P-M and K is equal to Q-N.

3. The antenna extension system according to claim 2, wherein the handheld communication device further comprises:

a first display module, coupled to the first control module, wherein the first control module controls the first display module to display a first enabling message when the first control module determines that J is equal to P-M and K is equal to Q-N.

4. The antenna extension system according to claim 3, wherein the first control module controls the first display module to display a first disabling message and sends a disabling command to the base device when the first control module determines that J is unequal to P-M or K is unequal to Q-N.

5. The antenna extension system according to claim 4, wherein the base device further comprises:

a second display module;

a second detection module, coupled to the second extension connector and detecting if the enabling command or the disabling command is received; and a second control module, coupled to the second display module and the second detection module, wherein the second control module activates the J sets of transmitting antennae and the K sets of receiving antennae and controls the second display module to display a second enabling message when the second detection module receives the enabling command; and the second control module controls the second display module to display a second disabling message when the second detection module receives the disabling command.

6. The antenna extension system according to claim 1, wherein the communication protocol comprises 3GPP LTE standard, 3GPP LTE-Advanced standard, Evolved High Speed Packet Access (HSPA+) standard, and Wide Fidelity (WiFi) standard.

7. An antenna extension method adapted for enabling an antenna extension operation under a communication protocol by combining a handheld communication device with a base device, wherein the communication protocol requires P sets of transmitting antennae and Q sets of receiving antennae; the handheld communication device includes M sets of transmitting antennae, N sets of receiving antennae, and a first extension connector; and the base device includes J sets of transmitting antennae, K sets of receiving antennae, and a second extension connector, wherein P, Q, M, N, J, and K are positive integers respectively, the antenna extension method comprising:

detecting if the first extension connector and the second extension connector are connected;

determining whether J is equal to P-M and K is equal to Q-N when detecting that the first extension connector and the second extension connector are connected; and wherein the handheld communication device activates the M sets of transmitting antennae and the N sets of receiving antennae and sends an enabling command to the base device to enable the J sets of transmitting antennae and the K sets of receiving antennae when the handheld communication device determines that J is equal to P-M and K is equal to Q-N.

8. The antenna extension method according to claim 7, further comprising:

the handheld communication device displaying a first enabling message when determining that J is equal to P-M and K is equal to Q-N.

9. The antenna extension method according to claim 7, further comprising:

the handheld communication device displaying a first disabling message and sending a disabling command to the base device when determining that J is unequal to P-M or K is unequal to Q-N.

10. The antenna extension method according to claim 9, further comprising:

the base device activating the J sets of transmitting antennae and the K sets of receiving antennae and displaying a second enabling message when the base device receives the enabling command; and the base device displaying a second disabling message when the base device receives the disabling command.

11. The antenna extension method according to claim 7, wherein the communication protocol comprises 3GPP LTE standard, 3GPP LTE-Advanced standard, Evolved High Speed Packet Access (HSPA+) standard, and Wide Fidelity (WiFi) standard.

* * * * *